(12) United States Patent
Fields et al.

(10) Patent No.: US 10,366,136 B2
(45) Date of Patent: Jul. 30, 2019

(54) METHOD FOR INTERACTING WITH A WEB BROWSER EMBEDDED IN ANOTHER SOFTWARE APPLICATION

(71) Applicant: WOLTERS KLUWER ELM SOLUTIONS, INC., Houston, TX (US)

(72) Inventors: Chris Fields, Houston, TX (US); Vlad Kastovich, Houston, TX (US); Chris Clark, Houston, TX (US); Jeff Loden, Houston, TX (US)

(73) Assignee: WOLTERS KLUWER ELM SOLUTIONS, INC., Houston, TX (US)

( * ) Notice: Subject to any disclaimer, the term of this patent is extended or adjusted under 35 U.S.C. 154(b) by 0 days.

(21) Appl. No.: 15/710,689

(22) Filed: Sep. 20, 2017

(65) Prior Publication Data

US 2019/0087507 A1 Mar. 21, 2019

(51) Int. Cl.
*G06F 9/44* (2018.01)
*G06F 16/957* (2019.01)
*G06F 9/455* (2018.01)
*G06F 9/54* (2006.01)

(52) U.S. Cl.
CPC ........ *G06F 16/957* (2019.01); *G06F 9/45529* (2013.01); *G06F 9/547* (2013.01)

(58) Field of Classification Search
CPC ..... G06F 16/957; G06F 9/45529; G06F 9/547
USPC ........................................................ 717/100
See application file for complete search history.

(56) References Cited

U.S. PATENT DOCUMENTS

| | | | |
|---|---|---|---|
| 10,095,954 B1* | 10/2018 | Daliyot | G06K 9/6201 |
| 2005/0086670 A1* | 4/2005 | Christensen | G06F 9/465 |
| | | | 719/330 |
| 2006/0101442 A1* | 5/2006 | Baumgart | G06F 8/38 |
| | | | 717/162 |

(Continued)

OTHER PUBLICATIONS

Title:Querying the trajectories of on-line mobile objects, author: Dieter Pfoser et al, Publication Year: May 2001, source: ACM Digital Library.*

(Continued)

*Primary Examiner* — Chameli Das
(74) *Attorney, Agent, or Firm* — Marshall, Gerstein & Borun LLP

(57) ABSTRACT

Systems and methods are provided for manipulating objects in a framework software application that embeds another software application that does not natively support object manipulation controls of the framework software application. To overcome this difficulty, a user interface of the embedded software application is provided in an embedded window disposed within a framework window. Moreover, the user interface of the framework software application is provided in the framework window. Next, a transparent interface element, configured to detect events generated by the object manipulation controls of the framework software application, is generated, and is positioned over the embedded window. When the transparent interface element detects an object repositioning event related to repositioning an object visible from the framework window to the embedded window via the user interface of the framework software application, information related to the repositioned object is provided to the embedded software application.

16 Claims, 13 Drawing Sheets

(56) References Cited

U.S. PATENT DOCUMENTS

| | | | | |
|---|---|---|---|---|
| 2008/0120538 A1* | 5/2008 | Kurz | ................ | G06F 17/30893 |
| | | | | 715/255 |
| 2012/0297324 A1* | 11/2012 | Dollar | ............... | G06F 17/30899 |
| | | | | 715/760 |
| 2014/0297516 A1* | 10/2014 | Brown | ............... | G06F 3/04817 |
| | | | | 705/39 |
| 2015/0067559 A1* | 3/2015 | Missig | ............... | G06F 3/04845 |
| | | | | 715/765 |
| 2015/0346929 A1* | 12/2015 | Karunamuni | ......... | G06F 3/0483 |
| | | | | 715/777 |
| 2015/0347179 A1* | 12/2015 | Barraclough | ......... | G06F 16/957 |
| | | | | 718/103 |
| 2015/0365591 A1* | 12/2015 | Aronsson | ............... | G06T 11/60 |
| | | | | 348/239 |
| 2016/0026253 A1* | 1/2016 | Bradski | ............... | G02B 27/225 |
| | | | | 345/8 |
| 2016/0179310 A1* | 6/2016 | Chaudhri | ........... | G06F 3/04817 |
| | | | | 715/808 |
| 2016/0357507 A1* | 12/2016 | Decker | ................... | G06F 3/165 |
| 2017/0054793 A1* | 2/2017 | Urbach | .................... | G09G 5/14 |

OTHER PUBLICATIONS

Burgess, "Stupid Geek Tricks: Browse the Web from Outlook", downloaded from the Internet at: <https://www.howtogeek.com/80112/stupid-geek-tricks-browse-the-web-from-outlook-2/> (Mar. 31, 2009).

Caputo, "Label. BackStyle property (Access) | Microsoft Docs", downloaded from the Internet at: <https://docs.microsoft.com/en-us/office/vba/api/access.label.backstyle> (Aug. 6, 2017).

International Application No. PCT/US2018/051929, International Search Report and Written Opinion, dated Dec. 13, 2018.

Williams, "Managing Documents and Emails in Office 365 with MacroView", downloaded from the Internet at: <https://web.archive.org/web/20160521155736/http://macroview365.com/2016/03/04/managing-documents-and-email-in-office-365-with-macroview/> (May 21, 2016).

* cited by examiner

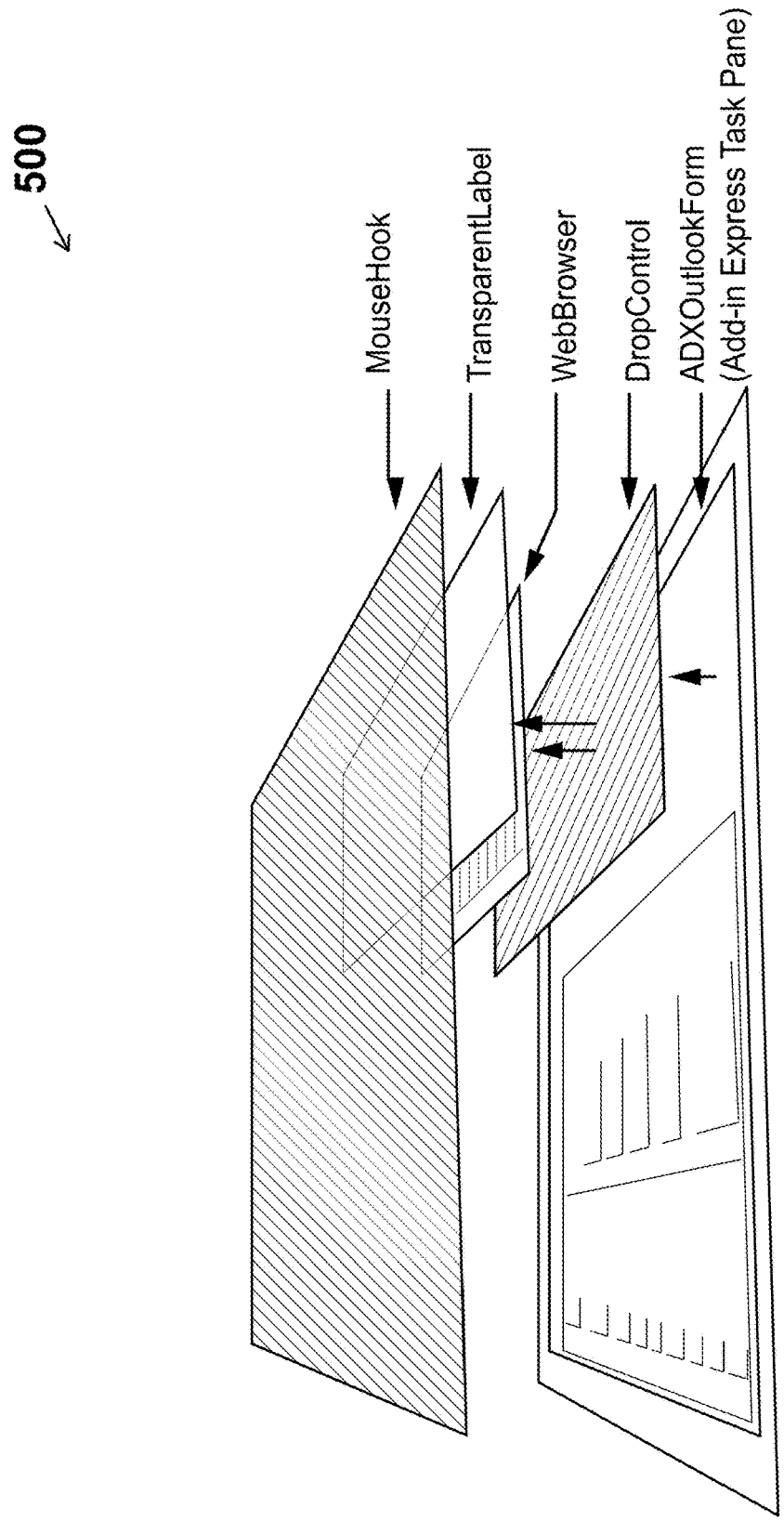

METHOD FOR INTERACTING WITH A WEB BROWSER EMBEDDED IN ANOTHER SOFTWARE APPLICATION

FIELD OF THE DISCLOSURE

This application generally relates to manipulating objects in a framework software application that embeds another software application that does not support object manipulation controls of the framework software application.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, certain software applications with user interfaces support functionality for embedding other software applications that have other, independent user interfaces. To this end, a framework software application running in a framework window (or another suitable graphical control element) typically allocates a smaller window inside the framework, allows the embedded application to surface its own user interface in the smaller window, and cedes control over the smaller window to the embedded application. In general, interactions between the user interfaces of the two software applications (the framework software application and the embedded software application) are limited. For example, drag-and-drop controls supported by the framework software application are not supported inside the smaller window for several reasons: it is generally undesirable for the framework software application to impose its user interface requirements onto the embedded application; it is generally desirable to allow the embedded application to exercise full control over its window; and the developer framework software application cannot assume architectural requirements of the embedded application.

One example of limited integration of an embedded application into a framework application is discussed below with reference to Microsoft's COM technology and web browsers. Microsoft introduced component object model (COM) add-in technology to make extending Microsoft Office easier for third-party application developers. COM add-ins can provide updates and generally expand the functionality of the existing Office applications, and can be built using any COM compliant tool (VBA, Visual Basic, Visual C++, etc.). An existing Office application (Outlook, Excel, Word, etc.) serves as a host for the add-in, which is a compiled DLL that is written and registered so that the Office application knows how to load and communicate with the add-in. For example, a web browser application interface can be hosted within Microsoft Outlook using a COM add-in. The web browser application interface is displayed as part of Outlook, i.e., appearing alongside Outlook's email interface. Advantageously, while the COM add-in may need to be downloaded, users do not need to download the web browser application itself, which allows changes and/or updates to the web application to be passed on to users without the need for a download.

However, one problem with extending Office using a COM add-in that implements a web browser application is that web browser controls do not natively support the ability to drag and drop objects from the Office interface directly into the web browser application. That is, while dragging and dropping objects within the Office interface is a standard feature (e.g., a user can click on an email or other document and drag it to a folder by holding down a mouse button over the document object, moving the cursor to the desired folder, and releasing the mouse button), dragging and dropping objects between the Office interface and the COM add-in web browser application interface is not supported. Consequently, it is not currently possible to drag an object (e.g., an email) from a first location (e.g., a folder) within the Office interface to a second location (e.g., another folder) within the web browser application interface and drop it there. Instead, when a user attempts to drop an Office object at a location within a web browser application interface, the web browser application will navigate to the object's file and render the object as a web page. Consequently, because the web browser application interface renders and displays these objects rather than interacting with them, the functionality of the web browser application hosted within the Office application is limited.

SUMMARY

In one aspect, a method for manipulating objects in a framework software application that embeds another software application is provided, wherein the embedded software application does not support object manipulation controls of the framework software application. The method includes providing, by one or more processors, a user interface of the embedded software application in an embedded window disposed within a framework window, wherein the user interface of the framework software application is provided in the framework window; generating, by the one or more processors, a transparent interface element configured to detect events generated by the object manipulation controls of the framework software application; positioning, by the one or more processors, the transparent interface element over the embedded window; detecting, by the transparent interface element, an object repositioning event related to repositioning, via the user interface of the framework software application, an object visible from the framework window to the embedded window; and in response to detecting the object repositioning event, providing information related to the repositioned object to the embedded software application.

In another aspect, a computer system for manipulating objects in a framework software application that embeds another software application is provided, wherein the embedded software application does not support object manipulation controls of the framework software application. The computer system includes one or more processors and one or more memories. The memories store instructions that, when executed by the one or more processors, cause the computer system to: provide a user interface of the embedded software application in an embedded window disposed within a framework window, wherein the user interface of the framework software application is provided in the framework window; generate a transparent interface element configured to detect events generated by the object manipulation controls of the framework software application; position the transparent interface element over the embedded window; detect an object repositioning event related to repositioning, via the user interface of the framework software application, an object visible from the framework window to the embedded window; and in response to detecting the object repositioning event, provide information related to the repositioned object to the embedded software application.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 5 illustrates an exemplary exploded view of the layers of controls implemented by a COM add-in to intercept attempted drag/drop operations from a framework application interface into an embedded software application interface.

DESCRIPTION

Figure 1:
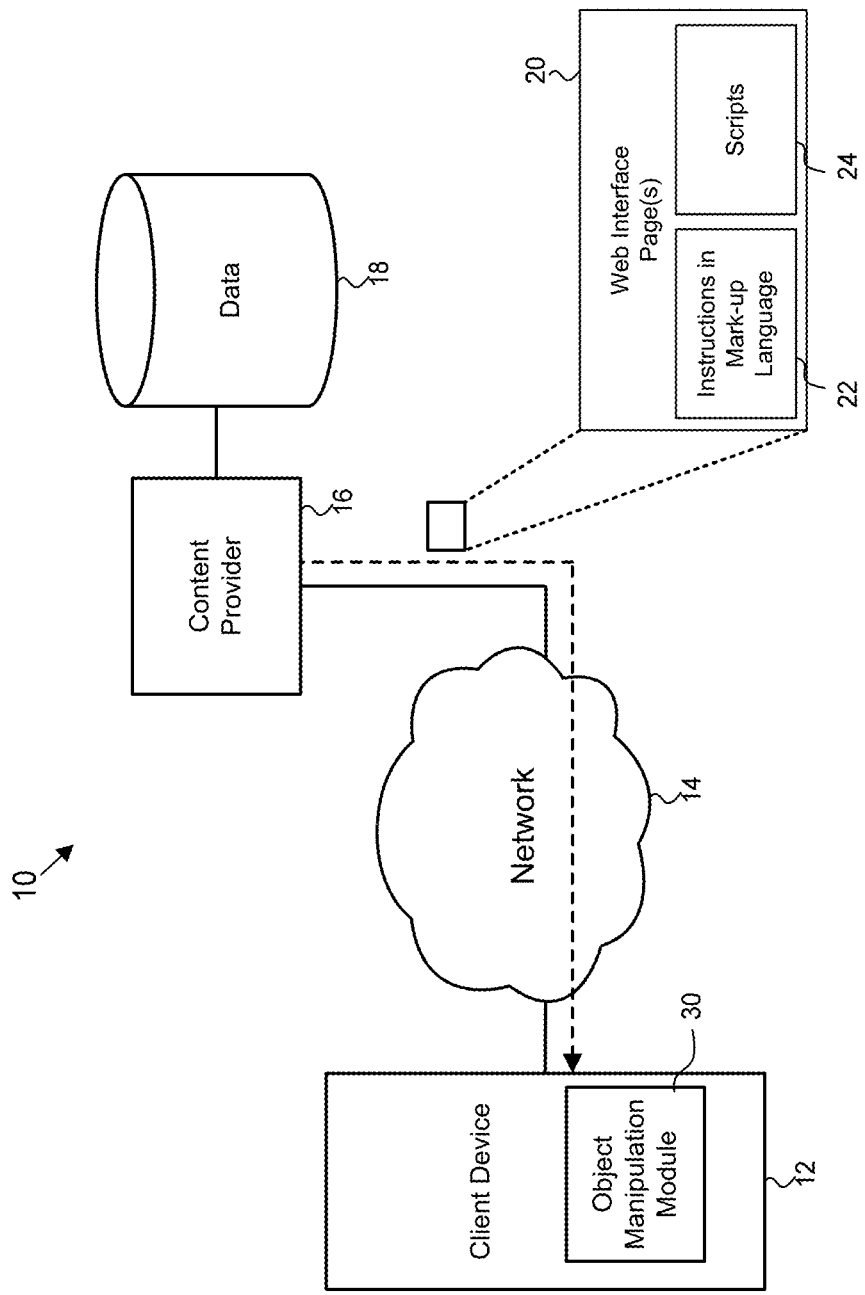
FIG. 1 illustrates an example computing environment in which the object manipulation techniques of this disclosure can be implemented.
Figure 2:
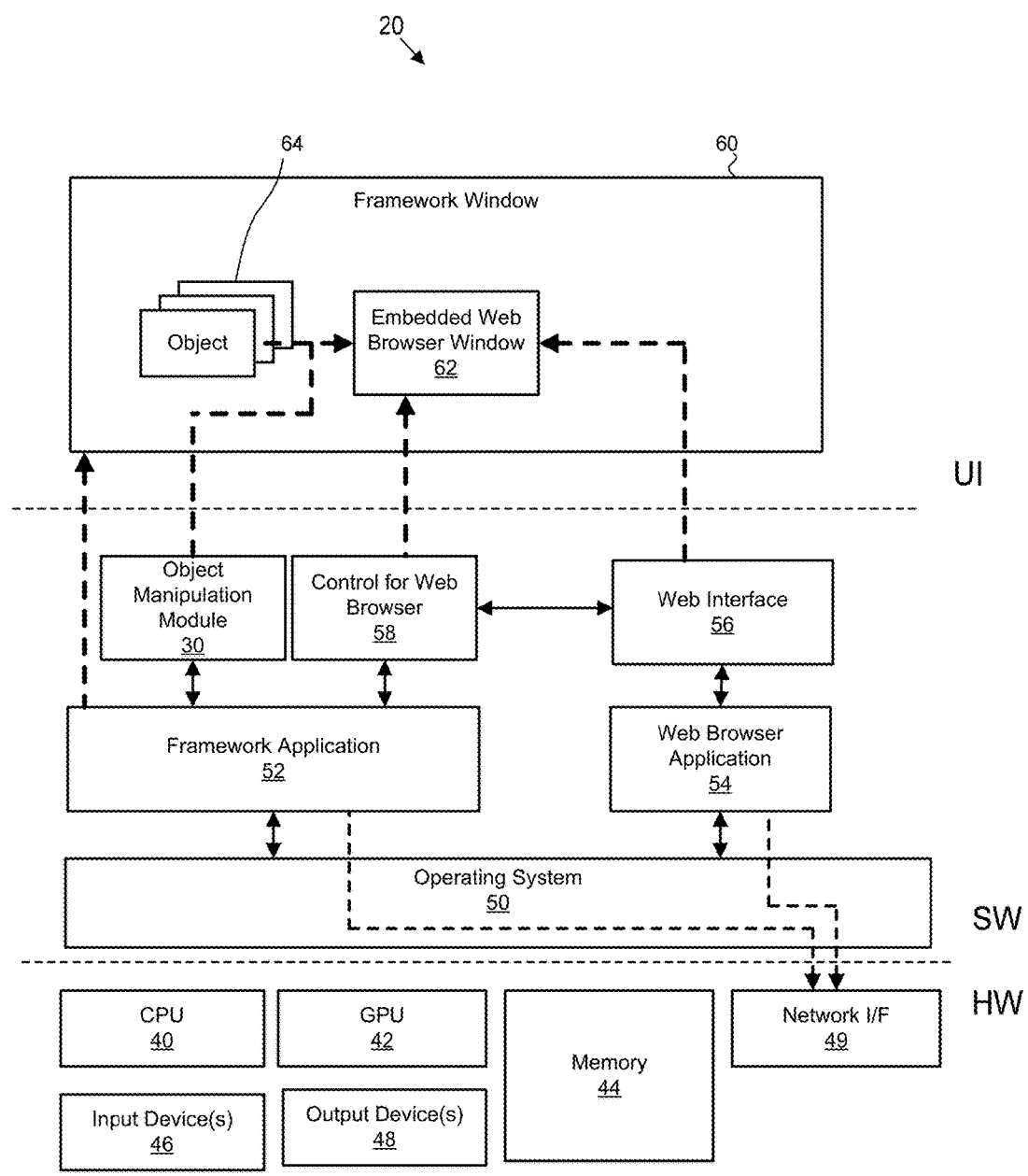
FIG. 2 illustrates an example architecture of a client device that can operate in the environment of FIG. 1.

FIG. 1 illustrates an example computing environment in which the techniques for manipulating objects in a framework software application can be implemented, and FIG. 2 schematically depicts several components of a client device that may operate in this computing environment.

Referring first to FIG. 1, a client device 12 such as a desktop computer, a laptop computer, or a tablet computer operates in an example computing environment 10. The client device 12 can access, in a wired or wireless manner, various content providers via a communication network 14, which can be a local area network or a wide area network such as the Internet. An example content provider 16 can provide to the client device 12 interactive web content 20 that can include text, images, and instructions 22 in a mark-up language as well as instructions 24 in a scripting language such as Javascript, for example.

In operation, the client device 12 can receive the interactive web content 20 and provide the content to the user via a user interface, as discussed below with reference to FIG. 2. In some cases, the user may wish to manipulate (e.g., drag-and-drop) objects visible in a certain software environment as if these objects were also compatible with the web content 20. Using the techniques of the present disclosure, an object manipulation module 30 allows the user to manipulate objects in this manner when a web browser application is rendered within a graphical control element (e.g., a window) controlled by another software application.

The client device 12 can have an example hardware/software/user interface (UI) architecture 20 depicted in FIG. 2. The architecture 20 includes one or more processors such as a CPU 40 and a GPU 42, for example. A memory 44 can include persistent memory components such as hard disk, flash memory, an optical disk, etc. as well as volatile memory components such as RAM, for example. The memory 44 can store instructions that implement the operating system and various software components discussed below. The architecture 20 also can include one or more input devices such as a mouse, or a keyboard, as well as one or more output devices such as a screen or speakers. A network interface module 49 can support any number of suitable communication protocols as TCP/IP, UDP/IP, etc.

An operating system (OS) 50 can be any suitable operating system such as Microsoft Windows, iOS, Linux, etc. The examples below focus specifically on Microsoft Windows and on problems software developers encounter with Microsoft software applications; however, it will be understood that the techniques of this disclosure can be applied to any operating system and any software environment in which operations on objects that can be related to multiple interdependent software applications are limited in a certain manner.

A software framework application 52 can execute on the OS 50 and support any number of extensions in the form of dynamic-link libraries (DLLs), for example, and various mechanisms for expanding the functionality of the application. For example, the framework application 52 can be a text editing document to which developers can add features using a certain software development kit (SDK) that includes various application programming interfaces (APIs) and various software tools for interfacing with the framework application 52. In the example configuration of FIG. 2, the provider of the framework application 52 provides a control 58 for embedding a web browser in the software framework application 52. As a more specific example, the framework application 52 can be provided for the .NET Framework with a robust class library, and a developer can use high-level APIs to instantiate an object of class WebBrowser.

A web browser 54 can execute on the OS 50 as an application separate and independent of the framework application 52. Using the control 58, the framework application 52 can cause the web browser 54 to render its user interface within a window 62 ("embedded window") which the framework application 52 allocates to the web browser 54 within its window 60 ("framework window"). In other words, from the perspective of the OS 50, the framework application 52 controls the entirety of the window 60, but the framework application 52 cedes control over the portion within the embedded window 62 to the web browser 54. Accordingly, the web browser 54 can render an interactive web interface 56 within the embedded window 62.

With continued reference to FIG. 2, the object manipulation module 30 referenced above can operate within the framework application 52 as a peer of the control 58, as a software wrapper of the control 58, or in any other suitable manner. In operation, the object manipulation module 30 generates a transparent interface element and processes user interface events to allow the user to drag and drop objects 64 into the embedded window 62 in a format which the web interface 54 can interpret (rather than trivially as bitmap images, for example).

The examples below refer specifically to mouse events, but it will be understood that similar techniques can be implemented to support gesture interaction with a touchscreen.

As discussed above, when a framework software application running in a framework window allocates a smaller window inside the framework to an embedded application, the embedded software application generally does not support object manipulation controls of the framework software application. As a specific example, when an Office application (such as, e.g., Outlook, Word, Excel, or Powerpoint) is extended using a COM add-in that implements an embedded web browser application, the web browser controls do not natively support the ability to drag and drop objects from the host Office application interface directly into the embedded web browser application interface.

Figure 3:
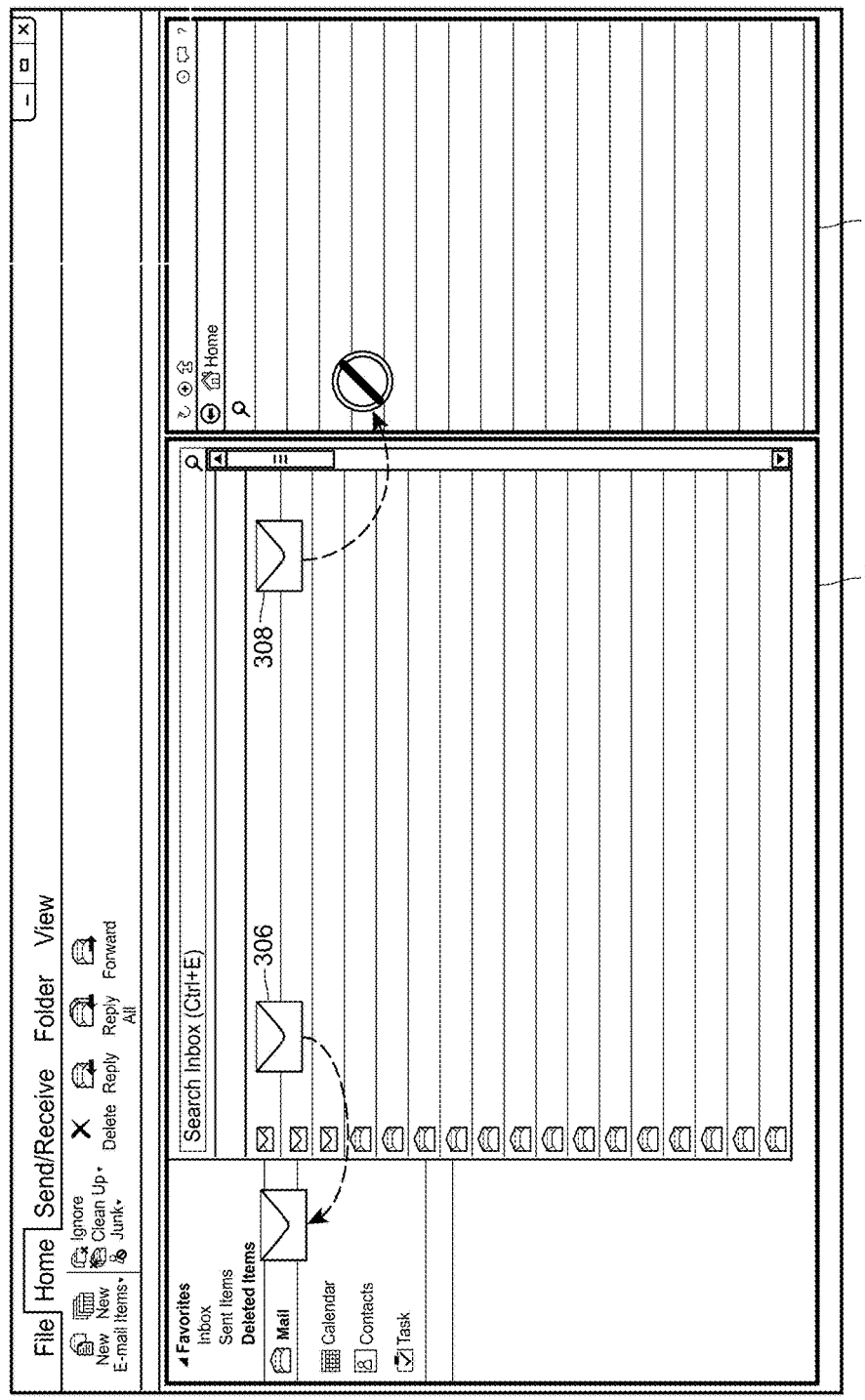
FIG. 3 illustrates an example failed drag/drop operation between a framework application interface and an embedded software application interface.

FIG. 3 illustrates an example failed attempt 300 to drag and drop objects from a host Office application interface 302 directly into the embedded web browser application interface 304. As shown in FIG. 3, dragging and dropping an email object 306 to a folder within an Outlook interface 302 is supported, while dragging and dropping an email object 308 between the Outlook interface 302 and an embedded web browser application interface 304 is not supported. Of course, while FIG. 3 depicts an Outlook interface 302, it will be understood that currently none of the Office applications (Word, Excel, Powerpoint, etc.) have an interface that supports dragging and dropping between the host Office application interface and an embedded web browser application interface. Consequently, the example problem shown in FIG. 3 represents a challenge present in all host Office application interfaces. Similarly, while FIG. 3 depicts a failed attempt to drag and drop an email object 308, it will be understood that dragging and dropping other types of objects (such as documents, attachments, etc.) from a host Office application interface into an embedded web browser application interface will result in similar failure using current techniques.

The methods and systems of this disclosure overcome these problems by generating a transparent interface element configured to detect events generated by the object manipulation controls of the framework application. In particular, the transparent interface element may be positioned over the embedded window, and may detect object repositioning events related to repositioning objects visible from the framework window into the embedded window. When the transparent interface element detects an object repositioning event, it provides information related to the repositioned object to the embedded software application.

Figure 4:
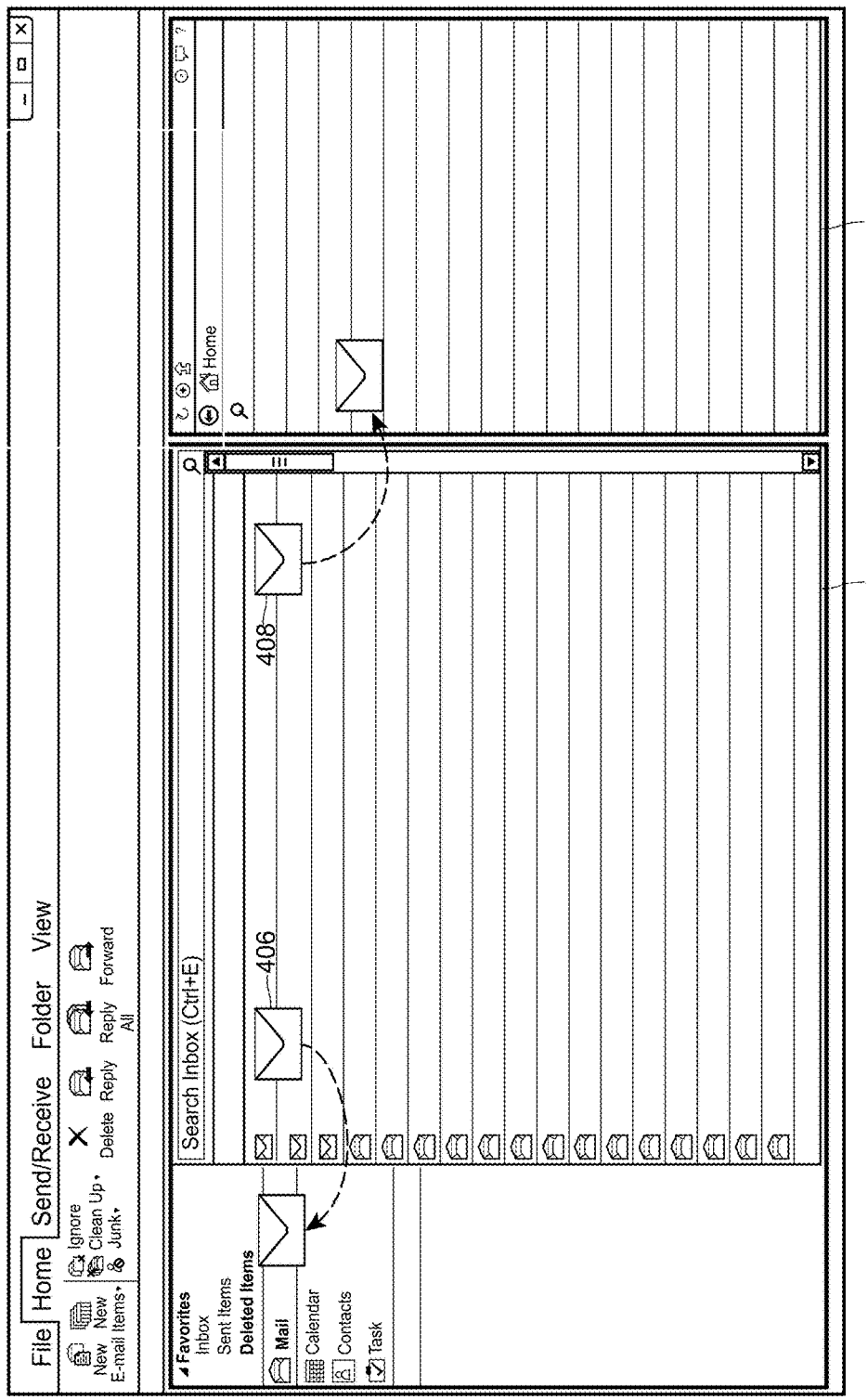
FIG. 4 illustrates an example successful drag/drop operation between a framework application interface and an embedded software application interface.
Figure 6A:
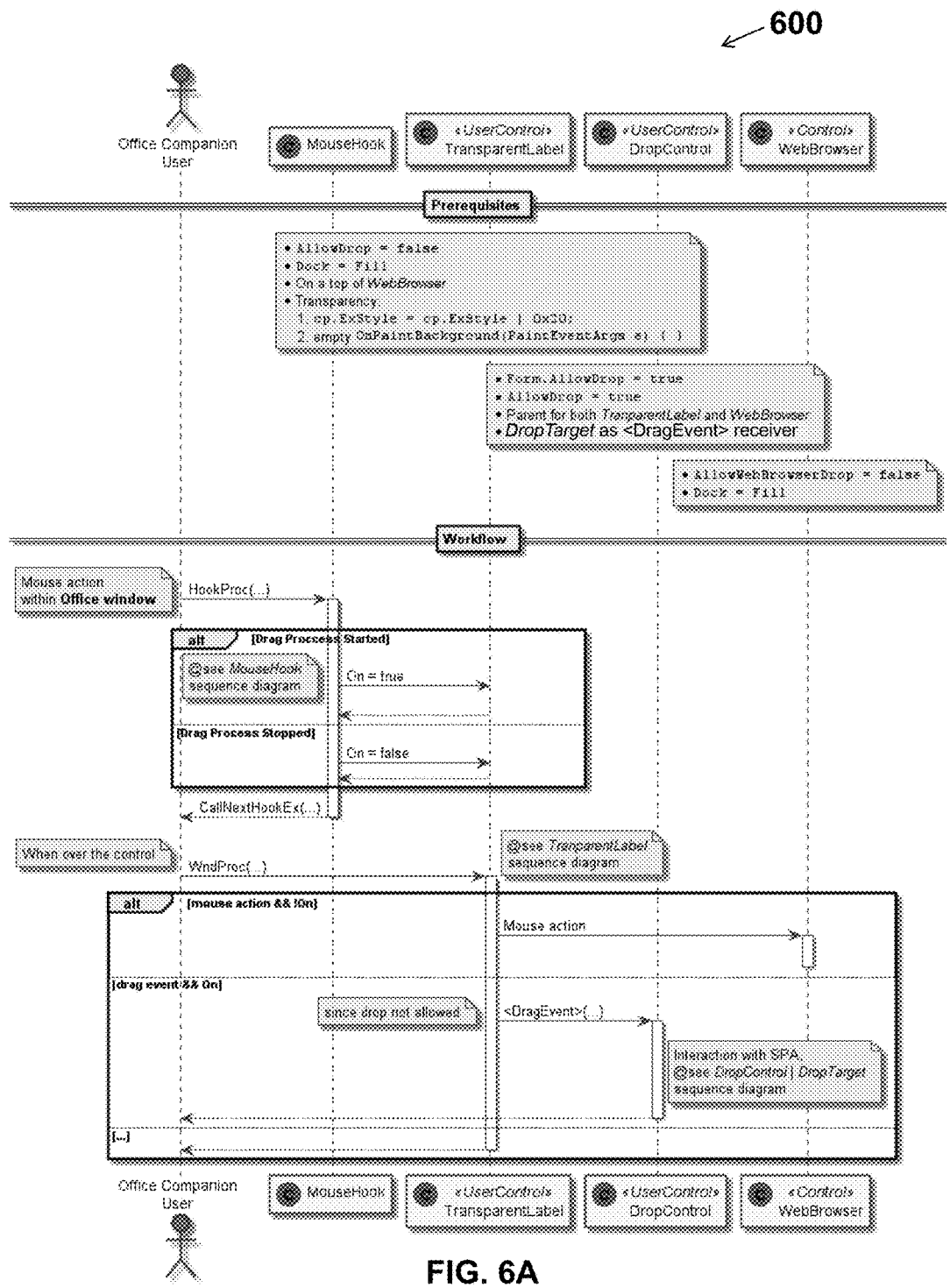
FIGS. 6A-6G depict a sequence diagram of an example sequence for manipulating objects in a framework software application that embeds another software application.
Figure 6B:
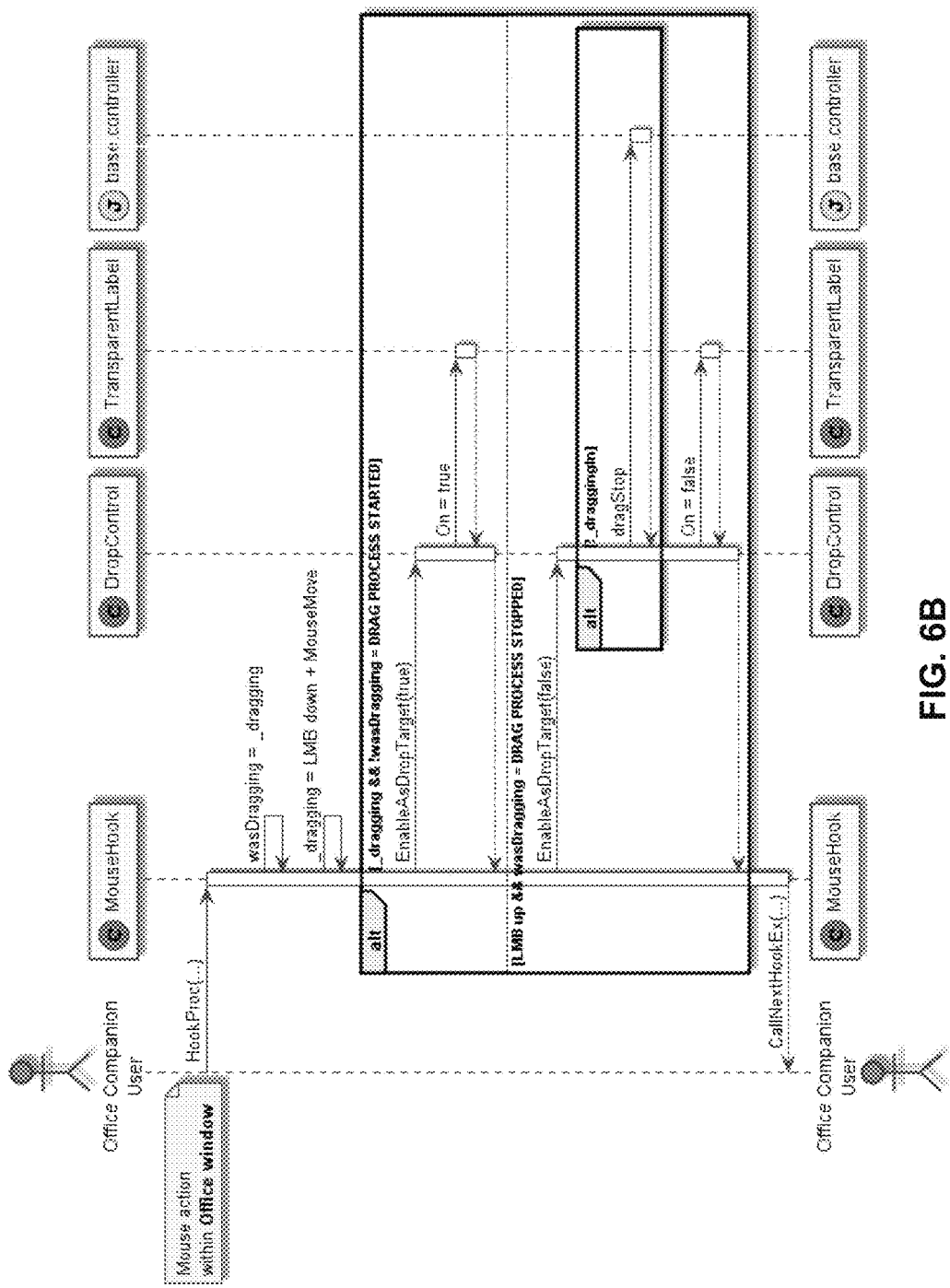
Figure 6C:
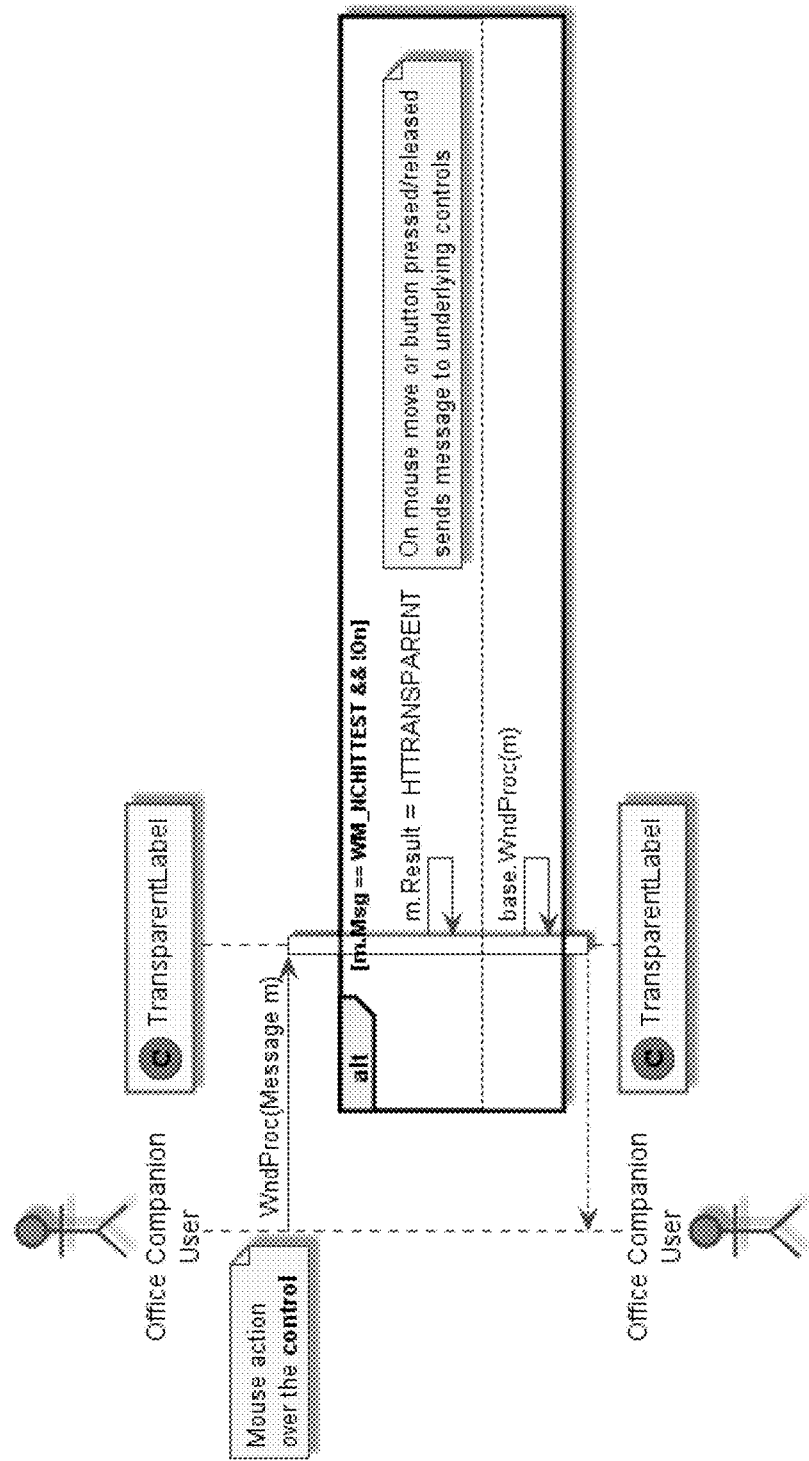
Figure 6D:
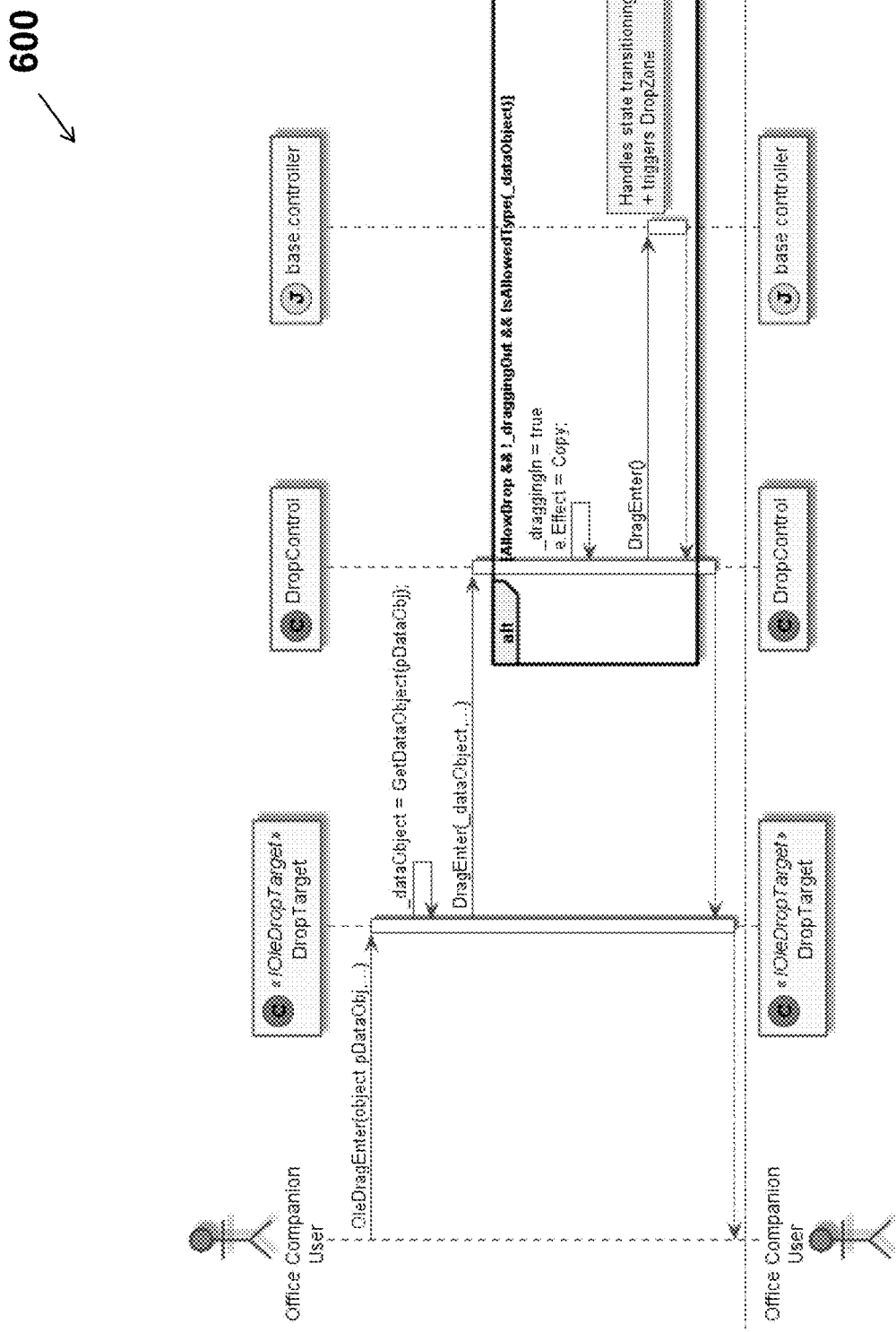
Figure 6E:
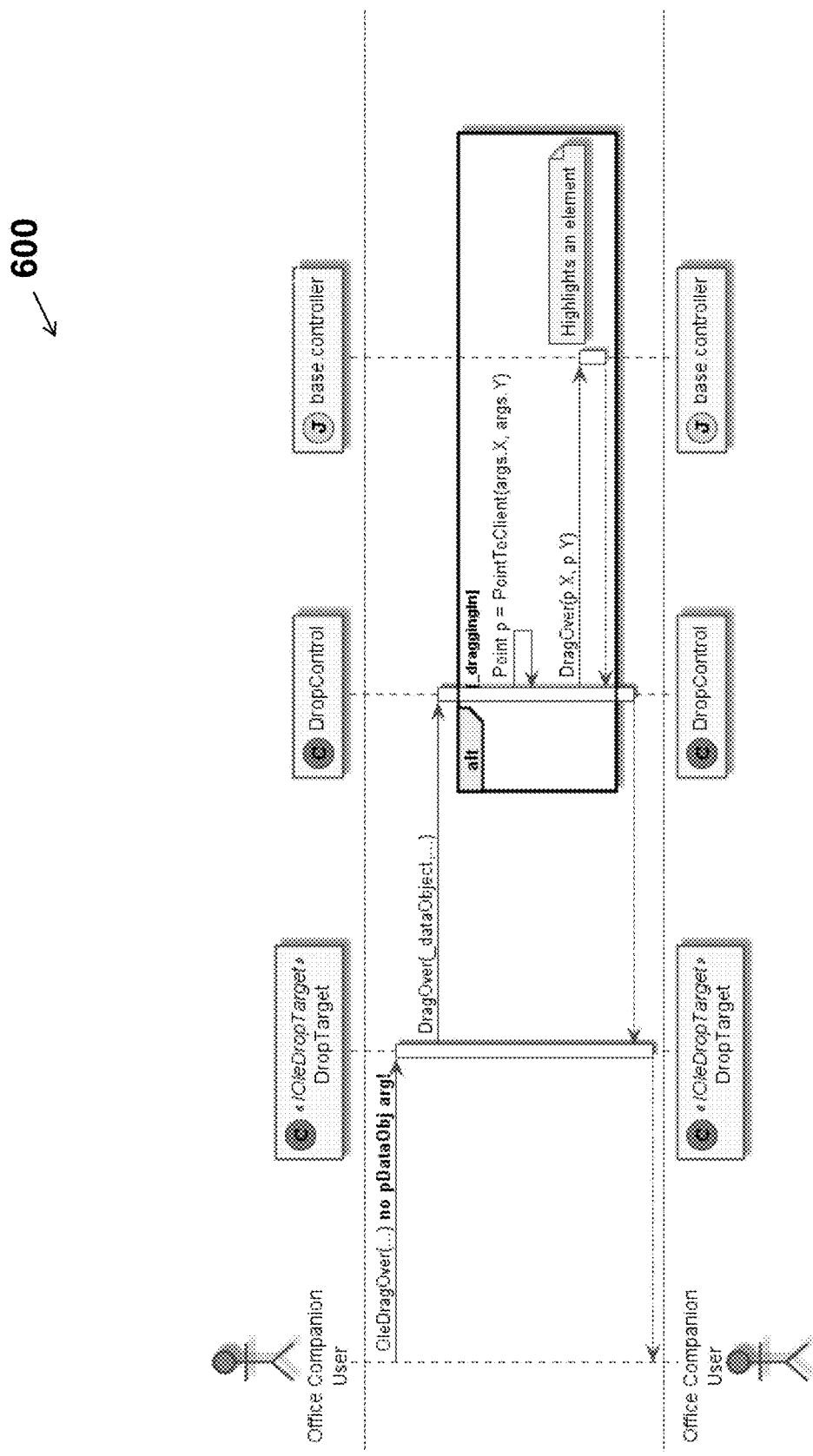
Figure 6F:
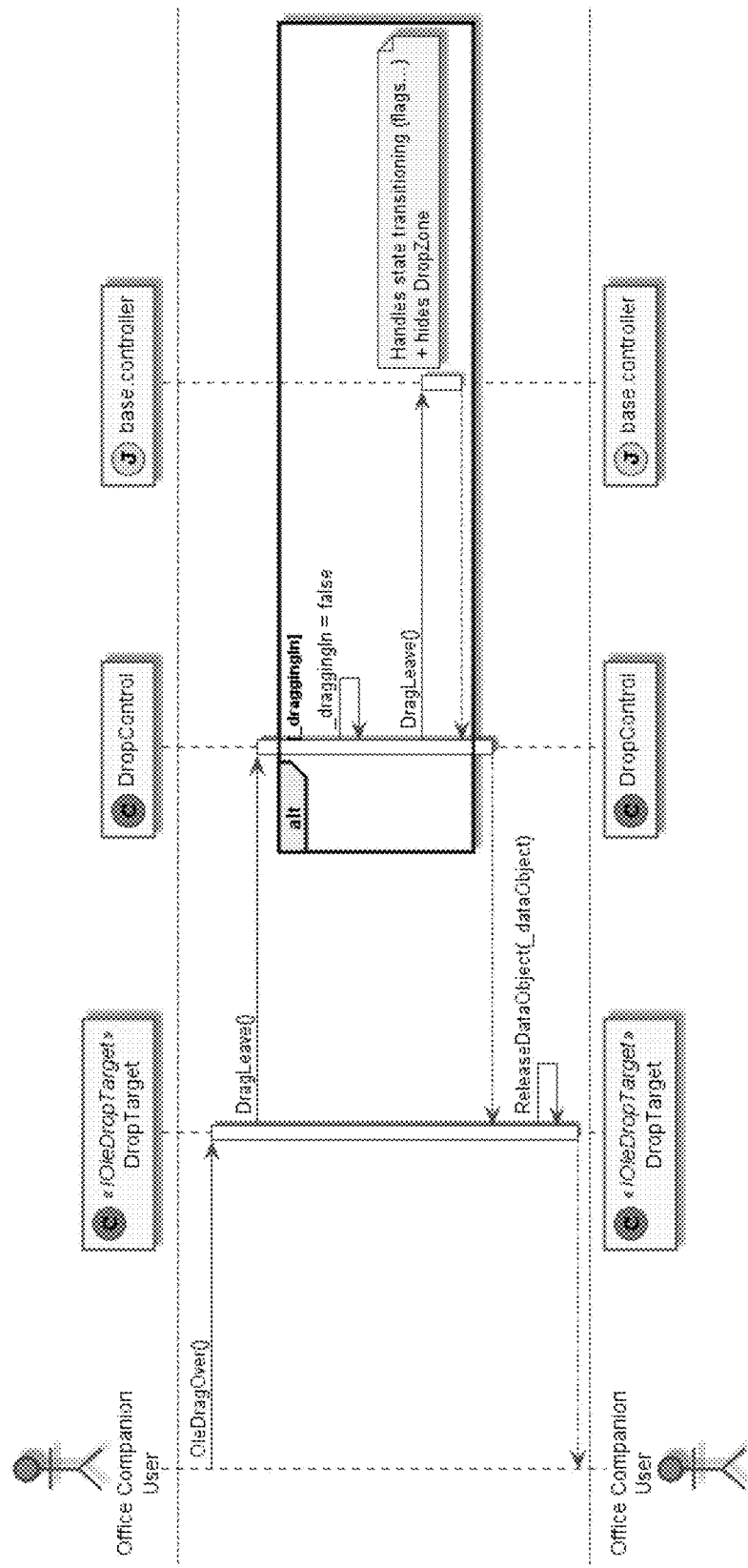
Figure 6G:
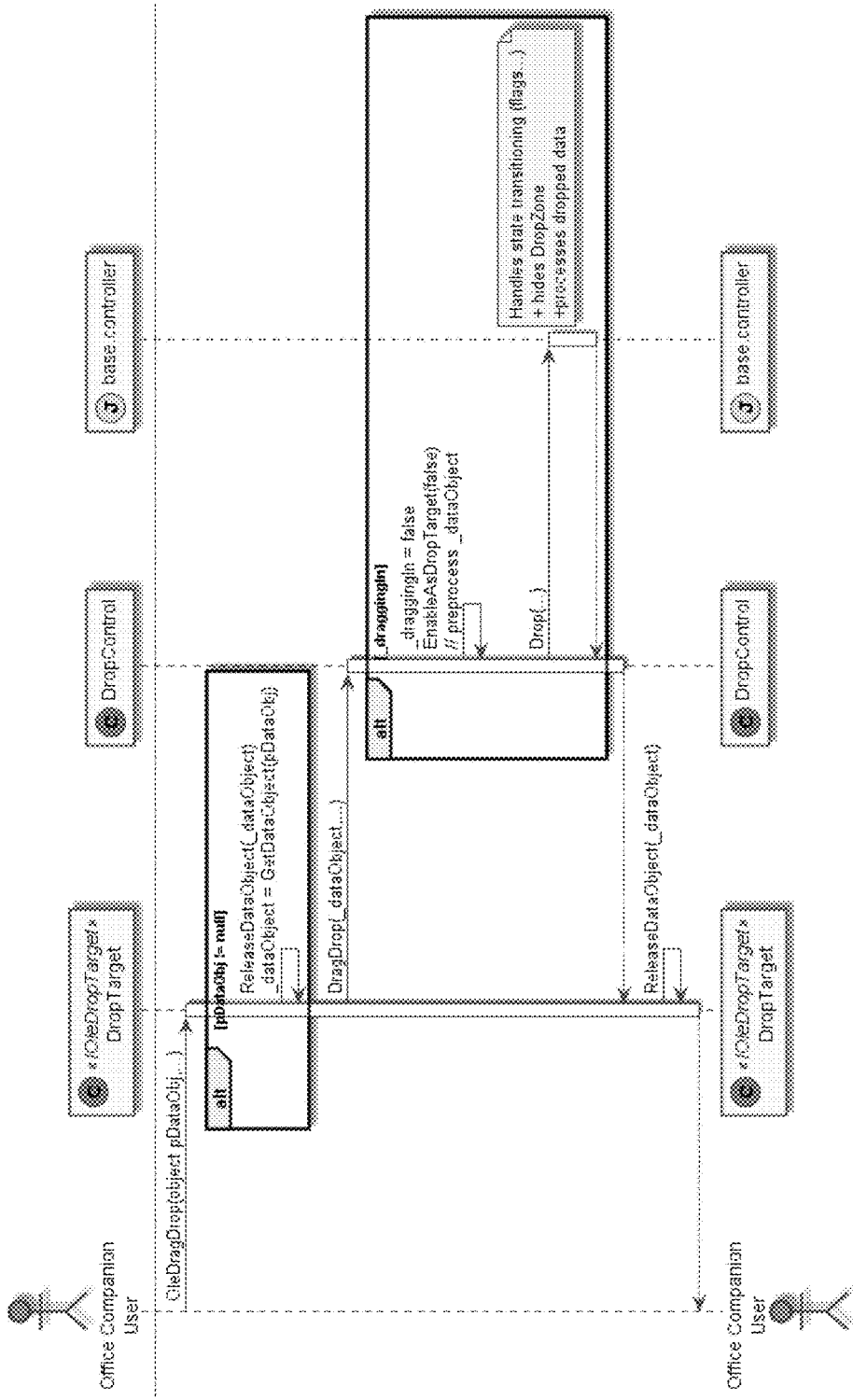

In the example of an Office application, this solution may be implemented using a COM add-in that is configured to "intercept" attempted drag-and-drop operations from a host Office application interface into an embedded web browser interface, to be discussed in greater detail below. For example, as shown in FIG. 4, the embedded web browser application supports dragging and dropping an email object 408 between an Outlook interface 402 and the embedded web browser application interface 404. Moreover, when the methods and systems of this disclosure are implemented, dragging and/or dropping an email object 408 between the Outlook interface 402 and the embedded web browser application interface 204 may appear the same to the user as dragging and dropping an email object 406 within the Outlook interface 402, creating a seamless user experience.

While FIG. 4 depicts dragging and dropping email objects 406 and 408, it will be understood that dragging and dropping other types of objects (such as documents, attachments, etc.) may also be supported by the embedded web browser application interface when the methods and systems of this disclosure are implemented.

In the example of an Office application, FIG. 5 illustrates an exemplary exploded view 500 of the layers of controls that may be implemented by an Office COM add-in configured to intercept attempted drag-and-drop operations from a host Office application interface (e.g., Office interface 402) into an embedded web browser application interface (e.g., embedded web browser application interface 404). As shown in FIG. 5, the COM add-in positions MouseHook as the top layer. MouseHook is a function or a set of functions invoked in response to mouse events occurring within the framework window. Mouse events may include, e.g., pressing and/or releasing mouse buttons, and/or moving the mouse. These mouse events may be indicative of object repositioning events, e.g., drag and drop operations. Furthermore, the COM add-in positions TransparentLabel between MouseHook and WebBrowser. Specifically, TransparentLabel is positioned over the embedded web browser application interface. TransparentLabel is a transparent interface element configured to provide information related to an object repositioning event to the embedded web browser application (WebBrowser) in Office. Although FIG. 5 depicts TransparentLabel and MouseHook as shaded, this shading is for purposes of illustration only. In implementation, both TransparentLabel and MouseHook appear invisible to a user of the application in this example. That is, even when TransparentLabel is positioned over the embedded web browser application interface and MouseHook is positioned over the entire host Office application interface, the user interfaces appear the same as they did prior to the positioning.

Turning to FIGS. 6A-6G, the sequence diagram 600 further illustrates the example of the Office application. Specifically, the sequence diagram 600 illustrates exemplary code that could be used to implement the methods of the present application into an Office application using a COM add-in. Using MouseHook, a user's mouse actions (e.g., mouse movements, mouse button pushes, etc.) may be detected. When MouseHook detects mouse actions that indicate a drag of an object (i.e., mouse button is pressed over object and mouse is moved) from the host Office application interface onto the embedded web browser application interface, MouseHook enables TransparentLabel. When MouseHook detects a mouse action that indicates a drop (i.e., mouse button is released) within the host Office application interface, MouseHook disables TransparentLabel. On the other hand, when MouseHook detects a mouse action that indicates a drop within the embedded web browser application interface, TransparentLabel remains enabled and intercepts the drag/drop operation.

By intercepting the drag/drop operation, TransparentLabel prevents the object from being opened (e.g., rendered as a web page within the web browser application interface). Instead, TransparentLabel handles the drag/drop operation by capturing the data associated with the object that was dragged/dropped, and funneling the captured data directly into the embedded web browser application in a format appropriate for the embedded web browser application to accept. The embedded web browser application in turn processes the data accordingly (e.g., uploading the captured data, storing the captured data, sorting the captured data, etc.) based on the positioning of the drop. For instance, if the object is dragged and dropped over an upload control within the web browser application interface, the data will be uploaded.

Accordingly, using the systems and methods disclosed herein, an object may be dragged from an origin location within a host Office application interface and dropped in a destination location within an embedded web browser application interface. Advantageously, because TransparentLabel is invisible, a user cannot see that it is positioned over the web browser application interface. That is, to the user, the email object appears to be seamlessly dragged from the origin location within the host Office application interface and dropped in the destination location within the web browser application interface located inside the COM add-in application.

Figure 7:
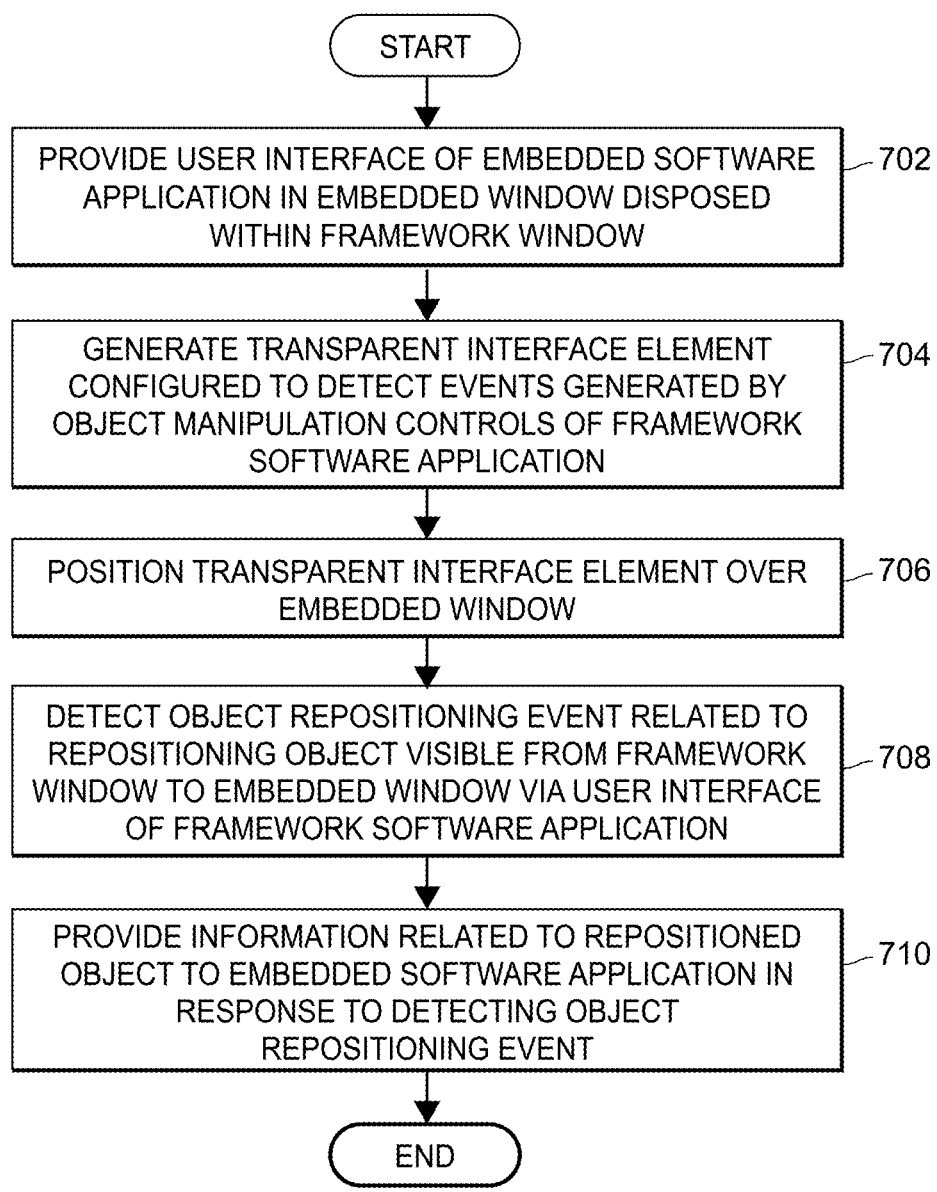
FIG. 7 is a flow diagram of an example method for manipulating objects in a framework software application that embeds another software application.

Now referring to FIG. 7, an example method 700 for manipulating objects in a framework software application that embeds another software application can be implemented a set of instructions stored on a computer-readable memory and executable on one or more processors of a suitable computing system. In particular, example method 700 may be implemented when the embedded software application does not support object manipulation controls of the framework application, such as object repositioning events (e.g., drag and drop events). In some embodiments, the framework software application may be a mailer application. Additionally, in some embodiments, the framework software application may be an Office application, such as, e.g., Outlook, Excel, Word, or Powerpoint.

At block 702, a user interface of an embedded software application (e.g., web browser application interface 404) may be provided in an embedded window disposed within the framework window. The user interface of the framework software application (e.g., Office application interface 402) may also be provided within the framework window. Providing the user interface of the embedded software application in the embedded window may include generating an object of a web browser type and placing the generated object within the embedded window.

In some implementations, providing the user interface of the embedded software application in the embedded window can span multiple stages, separated by user interface events. In particular, certain application frameworks do not manage memory allocation and release efficiently within embedded windows (at least for some objects embedded in these windows) and, as a result, the embedded software application slows down the framework application by acquiring a large amount of memory. To mitigate these situations, the method 700 can include loading only some of the instructions of the embedded software application or only some of the data, or even displaying only an icon to represent the availability of the embedded software application without actually loading the embedded software application. When the user activates the icon, the actual application is loaded, so as to minimize the period of time during which the use of memory is inefficient.

At block 704, a transparent interface element configured to detect events generated by the object manipulation controls of the framework software application may be generated. Generating the transparent interface element may include generating a transparent label (e.g., TransparentLabel discussed above with respect to FIGS. 5 and 6). At block 706, the transparent interface element may be positioned over the embedded window (e.g., as shown in FIG. 5).

At block 708, an object repositioning event related to repositioning, via the user interface of the framework software application, an object visible from the framework window to the embedded window may be detected (e.g., by Mousehook, discussed above with respect to FIGS. 5 and 6). In some embodiments, detecting the object repositioning event may include detecting that an email item is being dropped into the embedded window. In other embodiments, detecting the object repositioning event may include detecting that a document item is being dropped into the embedded window. Additionally, detecting the object repositioning event may include detecting a trajectory of the object repositioning event (e.g., a route of the mouse the object is dragged across the user interface).

At block 710, information related to the repositioned object in the embedded software application may be provided in response to detecting the object repositioning event. When the object repositioning event is an email being dropped into the embedded window, providing information related to the repositioned object may include retrieving mail content and metadata from the email item, encapsulating the retrieved mail content and the metadata into a message of a predefined format, and providing the message to the embedded software application. In particular, the embedded software application may be configured to process messages of the predefined format. Similarly, when the object repositioning event is a document being dropped into the embedded window, providing information related to the repositioned object may include retrieving document content and metadata from the document item, encapsulating the retrieved document content and the metadata into a message of a predefined format, and providing the message to the embedded software application.

Additionally, in some embodiments, providing information related to the repositioned object to the embedded software application may include providing the detected trajectory of the object repositioning event to the embedded software application. In such embodiments, the embedded software application may be configured to process the detected trajectory of the object repositioning event in order to display a visible indicator of the trajectory of the object repositioning event in the user interface of the embedded software application. For instance, the visible indicator of the trajectory of the object repositioning event may be an envelope icon to represent an email item (e.g., as shown in FIGS. 3 and 4).

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for manipulating objects in a framework software application that embeds another software application through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for manipulating objects in a framework software application that embeds another software application, wherein the embedded software application does not support object manipulation controls of the framework software application, the method comprising:
   providing, by one or more processors, a user interface of the embedded software application in an embedded window disposed within a framework window, wherein the user interface of the framework software application is provided in the framework window;
   generating, by the one or more processors, a transparent interface element configured to detect events generated by the object manipulation controls of the framework software application;
   positioning, by the one or more processors, the transparent interface element over the embedded window;
   detecting, by the transparent interface element, an object repositioning event related to repositioning, via the user interface of the framework software application, an object visible from the framework window to the embedded window, including detecting a trajectory of the object repositioning event; and
   in response to detecting the object repositioning event, providing information related to the repositioned object to the embedded software application, including providing the detected trajectory, and
   wherein the embedded software application is configured to:
   process the detected trajectory of the object repositioning event, and
   display a visible indicator of the trajectory of the object repositioning event in the user interface of the embedded software application.

2. The method of claim 1, wherein providing the user interface of the embedded software application includes:
   providing, by the one or more processors, an icon representing the embedded software application;
   detecting, by the one or more processors, an activation event associated with the icon;
   loading, in response to the activation event, the user interface of the embedded software application in the embedded window disposed within the framework window.

3. The method of claim 1, wherein generating the transparent interface element includes generating a transparent label.

4. The method of claim 3, wherein the framework software application is a mailer application.

5. The method of claim 4, wherein providing information related to the repositioned object includes:
   retrieving mail content and metadata from the email item, and
   encapsulating the retrieved mail content and the metadata into a message of a predefined format, and
   providing the message to the embedded software application, wherein the embedded software application is configured to processes messages of the predefined format.

6. The method of claim 1, wherein providing the user interface of the embedded software application in the embedded window includes generating an object of a web browser type and placing the generated object within the embedded window.

7. The method of claim 1, wherein detecting the object repositioning event includes detecting that an email item is being dropped into the embedded window.

8. The method of claim 1, wherein detecting the object repositioning event includes detecting that a document item is being dropped into the embedded window.

9. A computer system for manipulating objects in a framework software application that embeds another software application, wherein the embedded software application does not support object manipulation controls of the framework software application, comprising:
   one or more processors; and
   one or more memories storing instructions that, when executed by the one or more processors, cause the computer system to:
   provide a user interface of the embedded software application in an embedded window disposed within a framework window, wherein the user interface of the framework software application is provided in the framework window;
   generate a transparent interface element configured to detect events generated by the object manipulation controls of the framework software application;
   position the transparent interface element over the embedded window;
   detect an object repositioning event related to repositioning, via the user interface of the framework software application, an object visible from the framework window to the embedded window, including detect a trajectory of the object repositioning event; and in response to detecting the object repositioning event, provide information related to the repositioned object to the embedded software application, including provide the detected trajectory, and wherein the embedded software application is configured to:

process the detected trajectory of the object repositioning event, and display a visible indicator of the trajectory of the object repositioning event in the user interface of the embedded software application.

10. The computer system of claim 9, wherein the instructions that cause the computer system to provide a user interface of the embedded software application in an embedded window disposed within a framework window include instructions that cause the computer system to:

provide an icon associated with the embedded software application;

detect an activation event associated with the icon; and load, in response to the activation event, the user interface of the embedded software application in the embedded window disposed within the framework window.

11. The computer system of claim 9, wherein the instructions that cause the computer system to generate the transparent interface element include instructions that cause the computer system to generate a transparent label.

12. The computer system of claim 11, wherein the framework software application is a mailer application.

13. The computer system of claim 12, wherein the instructions that cause the computer system to provide information related to the repositioned object include instructions that cause the computer system to:

retrieve mail content and metadata from the email item, and encapsulate the retrieved mail content and the metadata into a message of a predefined format, and provide the message to the embedded software application, wherein the embedded software application is configured to processes messages of the predefined format.

14. The computer system of claim 9, wherein the instructions that cause the computer system to provide the user interface of the embedded software application in the embedded window include instructions that cause the computer system to generate an object of a web browser type and placing the generated object within the embedded window.

15. The computer system of claim 9, wherein the instructions that cause the computer system to detect the object repositioning event include instructions that cause the computer system to detect that an email item is being dropped into the embedded window.

16. The computer system of claim 9, wherein the instructions that cause the computer system to detect the object repositioning event include instructions that cause the computer system to detect that a document item is being dropped into the embedded window.

* * * * *